United States Patent Office 3,239,481
Patented Mar. 8, 1966

3,239,481
NOVEL ELASTOMERIC COMPOSITIONS
Dale J. Meier, El Cerrito, and Sol Davison, Richmond, Calif., assignors to Shell Oil Company, New York, N.Y., a corporation of Delaware
No Drawing. Filed Feb. 9, 1961, Ser. No. 88,011
16 Claims. (Cl. 260—41)

This invention relates to certain vulcanizable synthetic elastomers. More particularly, it relates to vulcanizable elastomeric copolymers of mono-olefins.

In Irish patent application 695/56, published January 9, 1957, there are described processes for producing synthetic elastomers by the copolymerization of mono-alpha-olefins having up to six carbon atoms. Most prominent is the copolymer of ethylene and propylene. The resulting copolymers, as the Irish patent application points out, are true copolymers as distinguished from physical mixtures of homopolymers. The Irish patent application does not disclose how the elastomers may be vulcanized and on considering the elastomeric copolymers in greater detail it will be seen that the means of accomplishing a cure of the elastomers is not readily apparent because they are free, or essentially free, of ethylenic unsaturation. The lack of unsaturation means that, as a practical matter, there are no sites at which vulcanization can take place.

Since that time, teachings have appeared which describe various means of effecting vulcanization of the copolymer. Of the various proposals, one of the best that has heretofore been described is to blend the copolymer with an organic peroxide, sulfur and carbon black and then vulcanize the composition at conventional temperatures and pressures. The resulting product has excellent physical properties which would indicate that the product is suitable for the manufacture of automobile and truck tires. As it happens, however, such vulcanizates, although having excellent physical properties, are not always suitable in actual practice because they may have an extremely offensive and repugnant odor. The present invention provides vulcanizates of the above indicated synthetic elastomers which vulcanizates may be substantially superior to the best of the prior art vulcanizates as well as being free of the offensive and repugnant odor.

In this description whenever reference is made to "elastomeric copolymers of mono-olefins" or words of similar meaning, it is to be understood that reference is had to copolymers of at least two olefins of the formula CH$_2$=CHR where R is hydrogen or an alkyl radical having up to four carbon atoms. Representative mono-olefins include ethylene, propylene, butene-1, pentene-1, hexene-1, 4-methyl-pentene-1, and the like. Representative elastomeric copolymers include ethylene-propylene, ethylene - butene-1, ethylene - pentene-1, propylene - hexene-1, and the like. In a preferred embodiment the elastomers are prepared with ethylene and one other mono-olefin having up to six carbon atoms wherein the copolymer contains at least about one mole percent of polymerized ethylene. Particularly preferred are the elastomeric copolymers of ethylene and propylene and for the sake of brevity, and because the present invention applies equally to the elastomeric copolymers of the type mentioned above, the invention will be described mainly as it relates to the most preferred embodiment of the ethylene-propylene elastomers.

It is an object of this invention to provide novel vulcanizable compositions of elastomeric copolymers of mono-alpha-olefins. It is another object to produce such compositions which have improved processability, and when vulcanized have improved physical properties. It is still another object of this invention to provide such compositions which are easily prepared so as to be free of objectionable odor. Other objects will become apparent as the description of the invention proceeds.

These and other objects of this invention, in one embodiment, are accomplished by a vulcanizable composition comprising a blend of (1) an elastomeric copolymer of mono-alpha-olefins having up to six carbon atoms, the copolymer being essentially free of ethylenic unsaturation, and (2) an oleophilic silica, which is described more fully hereafter. Such silicas are also referred to sometimes as "modified silica" or "coated silica." By another embodiment of the invention the composition may contain certain basic materials such as a basic metal oxide or a basic metal salt of certain organic acids. Finally, the vulcanizable composition will contain still other ingredients which are needed to produce the vulcanizate and such ingredients include a free radical initiator and a cross-linking agent, such as sulfur or sulfur producing compounds. These various embodiments of the invention will be described more fully hereinafter but it will be useful to briefly describe the elastomeric copolymers and some methods of producing them.

In this description whenever reference is made to proportion of ingredients in the composition, the figures are based on 100 parts by weight of the copolymer, unless otherwise indicated, and may be designated as "phr.".

In essence, the elastomeric copolymers may be produced by polymerizing a mixture of monomers, as ethylene and propylene, in the presence of an inert hydrocarbon solvent with a catalyst that comprises the reaction product of a metallo-alkyl compound of Groups I, II or III and a compound of a metal halide as vanadium chloride or vanadium oxychloride. The ratio of monomers, as ethylene to propylene, that is maintained during the polymerization will vary depending on the proportion of the respective monomers desired in the final elastomer. This in turn will vary depending upon the ultimate formulation desired in the vulcanizate. In any case in the preferred embodiments the elastomer may contain from about 20 mole percent to about 90 mole percent of ethylene units in the copolymer and still be useful in the formation of rubbers. Because the monomers do not polymerize at the same rate, i.e., ethylene polymerizes faster than propylene, the ratio of the starting mixture of monomer is not the same as that desired in the final product and this is one of the major considerations in selecting the starting monomer ratios to give a particular final product. Other considerations are the choice of catalyst components and their respective proportions and the polymerization conditions. By way of illustration, Table I indicates variations of ethylene units in the final elastomer as the ratio of ethylene to propylene in the starting monomer mixture is varied. For this table, polymerizations were conducted at 45–65° C. in n-heptane solvent and the catalyst was the reaction product of trihexylaluminum and vanadium oxychloride in a mole ratio of 3.0:1.

Table I

| Mole percent ethylene in feed gases | Mole percent ethylene in copolymer |
|---|---|
| 8.0 | 24.0 |
| 18.0 | 48.1 |
| 26.0 | 57.7 |
| 32.0 | 62.4 |
| 50.0 | 80.3 |

Other suitable alkyl aluminum compounds as the catalyst component include trioctyl aluminum, trinonyl aluminum, tridecyl aluminum, triisobutyl aluminum, and others. Preferably the alkyl radicals of the trialkyl aluminum have more than 4 carbon atoms but not more than 16 carbon atoms. For economic reasons, the number of carbon atoms in the alkyl radicals preferably range from 4 to 10.

The ratio of the aluminum compounds to the vanadium oxychloride or vanadium tetrachloride may vary widely but preferably the aluminum to vanadium is greater than 2. The catalyst is simply prepared by mixing and reacting the catalyst components in a hydrocarbon solvent whereupon there is formed a reaction product which is the catalyst.

In the prior art vulcanizates of the elastomeric copolymers, there is a strong preference for copolymers containing from 60 to 65% of polymerized ethylene. It is a substantial advantage of the present invention that highly suitable vulcanizates may be obtained when the copolymer contains a much broader range of polymerized ethylene, i.e., from about 20 to 95 or 99 mole percent. At the ends of the range the copolymer has different utility such as in the preparation of elastic filaments, gum vulcanizates and the like. In the range from about 50 to 70 mole percent the copolymers may be used to prepare vulcanizates that are suitable for tire manufacture.

The silica substrate of the instant compositions is a modified silica which substrate has a reactive silanol surface. The silica is mainly amorphous and the surface is largely bounded by —OH groups so that the surface layer may be represented by the formula —SiOH, which is the silanol surface. Modifying the surface comprises replacing some or all of the active hydrogen atoms with a radical containing a terminal alkyl group having from 1 to 18 carbon atoms thereby forming a modified silica substrate of the formula —SiOA where A is the radical that contains the terminal alkyl. While this invention is not to be limited by any theoretical considerations, it is believed that the terminal alkyl group causes the necessary silica to be made compatible with the elastomeric copolymer and thereby causes complete dispersion into the elastomeric copolymer either as a physical mixture or as a reaction product. This modification makes the silica "oleophilic" (or organophilic) and accordingly this component is referred to sometimes here as "oleophilic silica."

The oleophilic silica is a component that is particularly capable of wide variation for two reasons. Firstly, —A in the above formula is limited only by the requirement that it contain a terminal alkyl radical. Secondly, any number from 0.1 or less to 100% of the active hydrogen atom of the silanol groups can be replaced with A and still afford the benefits of this invention. It is the better practice, however, to replace from about 5% to about 100% of the active hydrogen. These modified silicas are well known in the art and they are sometimes referred to as "coated silicas." One such well-known silica is an esterified product wherein the surface silanol is reacted with an alcohol, as butanol, to produce a butylated ester of the silanol. The number of active hydrogen atoms that are replaced is entirely variable and is largely a cost consideration. More information on such esterified products, which are called "Estersils" may be had by making reference to U.S. Patent 2,657,149. Representative of another group of modified silanol is the product obtained by the reaction of the active hydrogen with carbonyl chlorides to produce oleophilic silica of the formula —SiO—COR where R again is an alkyl radical of 1 to 18 carbon atoms. Yet another example is the product obtained by reacting the silanol surface, i.e., —SiOH, with an epoxide of the formula

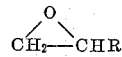

wherein R is an alkyl radical of 1 to 18 carbon atoms. Thus, when the epoxide is propylene oxide of the formula

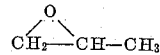

then the modified silanol has the formula

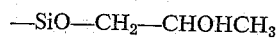

The silanol, as another example, may be treated with a trialkyl chlorosilane, as the trimethyl, to produce a modified silica of the formula —SiO—Si(CH$_3$)$_3$. The reaction of the active hydrogen with a dialkyl-dichlorosilane, as the dimethyl, seemingly has the advantage that lesser amounts may be used since one mole reacts with two silanol hydrogen atoms. The product in that case may be represented as:

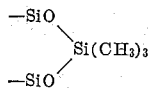

Other silanes that may be used to modify the silanol surface are represented by ethyl dichlorosilane diethyl chlorosilane, vinyl chlorosilane, divinyl dichlorosilane, isopropenyl chlorosilane, 4-pentyl tribromosilane methyl bromosilane and the like. The important feature of the modified silane, as previously indicated, is that it contain the necessary terminal alkyl radicals. Thus the choice of modifying compound is actually a cost consideration and accordingly those formed from lower alcohols and simple alkyl chlorosilanes are more preferred at present.

From a consideration of the modified silica, it will be seen that they are formed by an esterification of the surface —SiOH groups by replacing the hydrogen atom. This may be done by splitting out hydrogen to form hydrogen chloride or water. Alternatively, ester interchange may be used and the method of esterification form no part of this invention.

Other materials that contain silica can be used as the substrate such as various asbestos, minerals, clays, kaolins, bentonites, micaceous minerals and the like. Such materials, however, usually do not contain too many silanol groups on the surface and thus it may be necessary to prepare these materials by providing the silanol groups. This may be accomplished by any means known in the art. Thereafter the silanol groups are reacted to remove some or all of the active hydrogen as previously indicated.

The quantity of the oleophilic silica may be varied a great deal for the reasons previouly indicated. However, because the silica and the extent of conversion of the silanol groups can be varied, this component is particularly capable of wide variation. Since the modified silica is a reinforcing ingredient, it usually will be present in amounts somewhat greater than the other ingredients of the composition, exclusive of the copolymer. Thus the amounts employed usually range from about 10 phr. to amounts in excess of 100 phr. Amounts in the order of 150 phr. will be found to yield suitable vulcanizates also. Much lesser amounts, i.e., in the order of 0.5 phr., may be used for reinforcing latices of the elastomeric copolymers. It may be useful as a guide to a better understanding of the examples to indicate a range of the more preferred amounts in relation to the extent of conversion of the silanol groups. The particular replacement for the active hydrogen is of lesser importance and need not be considered in this guide. Thus, it appears that amounts from about 30 to about 90 phr. are most suitable, particularly when the active hydrogen of the silanol is replaced with from about 5 to about 100 mole percent of a radical containing terminal alkyl radicals from 1 to 18 carbon atoms when a vulcanizate is to be prepared which has properties exemplified in the tables that appear hereinafter.

In preparing the compositions of this invention, the order in which the various components are brought together and blended is not critical. However, in actual practice, there are certain advantages in preparing first a blend of the elastomeric copolymer and the modified, or coated, silica. This arises from the desirability of assuring that the modified silica is thoroughly and uniformly blended with the elastomeric copolymer inasmuch as this is quite important to the performance of the vulcanizates. For that reason there are advantages in preparing such a blend at the site where the elastomeric copolymer is manufactured. In that way the modified silica can be uniformly incorporated into the elastomeric copolymer during some stage of the recovery processes for the elastomeric copolymer. The blend of these two ingredients, in actual practice, may then be shipped to the manufacturers of vulcanizates who then add additional ingredients that are needed to prepare the desired vulcanizates. Among these added ingredients there may be mentioned, with more particularity, the certain basic materials and the free radical initiator, or source.

The basic materials are not wholly essential to the compositions of this invention. They are often used since they always result in products that have higher tensile properties. When products are to be prepared where tensile strength is of lesser importance, then the basic materials may be omitted. In any case not all basic materials are suitable and the ones suitable for the purposes of this invention are selected from basic metal oxides, basic lead salts and basic metal salts of organic acids which have ionization contants less than $10^{-4}$. The amount of the basic material used in the compositions may range from about 2 to 20 phr. although amounts in the order of 4 to 10 phr. are used more often.

Among the basic oxides there may be mentioned magnesium oxide, calcium oxide, zinc oxide, strontium oxide, cadmium oxide, barium oxide, titanium oxide, zirconium oxide, tin oxide, lead oxide, bismuth oxide, antimony oxide and the like. Further, mixtures of basic oxides may be employed in order to obtain not only cost advantages but also other advantages in processing and physical properties of the resulting vulcanizates. Generally, however, zinc oxide appears to perform better as will be seen from the examples to be presented hereinafter. Nevertheless, differences between zinc oxide and other basic oxides such as magnesium oxide, are not great and by modifying the formulation within the scope of this invention and the vulcanizing conditions, the final products, using basic oxides other than zinc oxides, may be improved substantially as will be readily appreciated from the examples. The basic lead salts are more suitable when used together with a basic metal oxide although they may be used alone. Among the representative members of this class there may be mentioned dibasic lead phosphite, tribasic lead sulfate, tribasic lead maleate, tribasic lead succinate, and the like. Among the organic acids having ionization constants less than $10^{-4}$, there may be mentioned formic acid, propionic acid, stearic acid, lauric acid, benzoic acid, p-tert-butyl phenol and the like and the salts are represented by, for example, calcium formate, magnesium propionate, zinc stearate, calcium benzoate, and the like.

When these basic materials are to be used, the same advantages are obtained when they are incorporated into the elastomer, together with the coated silica, at the site of manufacture of the elastomer. The three component composition then has added to it other ingredients that are needed to produce the vulcanizate and one of the essential ingredients is a free radical source.

The free radical source, or initiator, functions to abstract hydrogen from the polymer thereby forming polymer radicals which react further to form cross linked vulcanizates. Accordingly, any free radical source may be used. Most common among the free radical sources are organic peroxides, although other free radical sources may be used. Organic peroxides effect essentially complete vulcanization at temperatures ranging from about room temperature to 400° C. in times up to three hours or more. This definition excludes hydrogen peroxide which is not suitable for the purposes of this invention as it is not feasible to incorporate it into the elastomer. Also unsuitable are metallic peroxides, as calcium peroxide, as such compounds have decomposition temperatures that are too high. Among the organic peroxides that may be employed, mention is made of dicumyl peroxide, dialkyl peroxides as di-tert-butyl peroxide, tert-butyl cumyl peroxide, aroyl peroxides as benzoyl peroxide, lauroyl peroxide, tetraline peroxide, urea peroxide, butyryl peroxide, tert-butyl-perbenzoate and the like. Although organic peroxides as a class are suitable for the purposes of this invention not all organic peroxides or peroxygen-type compounds are equivalent because of differences in decomposition rate inherent in their structure. This, in effect, means that the curing cyces of heat and pressure during vulcanization will require modification depending upon the choice of the peroxygen-type of compound used. Generally, 5 to 10 times the half-life of the peroxide is required to complete vulcanization of the elastomer. Among the more preferred peroxides there may be mentioned benzoyl peroxide and alkyl substituted derivatives thereof where the alkyl radical contains up to 12 carbon atoms; diacyl peroxide of the formula

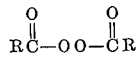

where the R's are derived from aliphatic acids as lauric acid; peroxyesters as tert-butyl perbenzoate and p-methyl perbenzoate are also among the more preferred members. Such peroxyesters have the formula

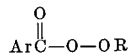

where R is derived from any tertiary alcohol particularly where one of the alkyl groups attached to the tertiary carbon atoms has more than two carbon atoms. Also suitable are other peroxygen compounds as persulfates, perborates, percarbonates, and the like. Thus, it will be seen that the choice of a particular peroxide very largely depends upon the vulcanization temperatures and such temperatures are largely a matter of choice that is made by a skilled rubber chemist after considering the composition as a whole and its subsequent utility.

Because the mechanisms of this invention require that polymer radicals be created, other sources for radical generation may be used. Other classes of free radical sources include azo compounds such as triazene derivatives of the formula R–N=N–N–R' wherein R may be a phenyl or substituted phenyl and R' may be selected from phenyl, benzyl, or alkyl radicals of 8 to 22 carbon atoms. Representative compounds of this group are 1,3-diphenyl-triazene, 1-phenyl-3-benzyl-triazene, 1,3-di-p-tolyl-triazene and the like. Also suitable, but more costly, is an ionizing source of radiation as a Van der Graff Accelerator. Such a source is particularly suitable for the preparation of elastomeric mono filaments.

The cross-linking of the polymer radicals may take place by either of two means. Firstly, polymeric free radicals may join with each other to form vulcanizates. Secondly, and more preferred, a free radical acceptor may be added as an additional ingredient. Among the free radical acceptors there may be mentioned sulfur, or sulfur containing compounds that release sulfur during vulcanization. Another class of suitable free radical acceptors are the quinones, including hydroquinone, and quinhydrones such as 1,4-benzoquinone, 2-chloro-1,4-benzoquinone, 2,4- and 2,5-dichloro-1,4-benzoquinone, stilbenequinone, 4,4'-diphenoquinone, 3,3',5,5'-tetra-t-butyl-4,4'-diphenolquinone, the corresponding quinhydrones, and the like.

Yet another class of free radical acceptors are polynuclear aromatic hydrocarbons having from 3 to 8 condensed rings and heterocyclic analogues thereof. Representative compounds of this class include anthracene, pyrene, benzanthracene, naphthanthracene, acridine, benzacridine and the like. Still other free radical acceptors are well known in the art and those too may be employed to produce suitable vulcanizates.

The quantity of the free radical acceptor that is employed may vary depending upon such considerations as the particular copolymer involved, the particular free radical source selected, the amount of free radical acceptor, the choice of the other ingredients in the composition, the vulcanizing conditions, and the like. Amounts ranging from about 0.05 to about 10 parts per hundred of elastomer will cover most cases, but amounts ranging from 0.25 to 5 phr. will be used more often.

The elastomeric compositions of this invention may, of course, be formulated together with other rubber chemicals. Thus, for example, tackifiers, plasticizers, pigments, vulcanization accelerators, peptizers and the like may also be blended into the composition before vulcanization. Carbon black also may be used either to pigment or as an additional reinforcing ingredient. In preparing the vulcanizates, the several ingredients may be processed by any conventional technique such as by milling or Banbury mixing. The blending operation should not be at temperatures that would cause the free radical source to function and accordingly the maximum blending temperature of about 70–80° C. is recommended. The vulcanization may be accomplished by any means. Normally, vulcanization is at temperatures ranging from about 100–200° C. but vulcanization by extruding in molten metal baths may be accomplished at temperatures up to 400° C. The invention is described in greater detail in the examples which present typical formulations according to this invention and in some cases comparative data. The examples will readily suggest how the compositions may be modified further, not only by changing equivalent ingredients but also by modifying the amounts of the ingredients. In the examples, the designation "$T_B$" means tensile strength at break; "$E_B$" is the elongation at break and "$M_{300}$" is the tensile stress at 300% strain.

EXAMPLE I

For this example and the corresponding data in Table I, the elastomer is a copolymer of ethylene and propylene containing about 65 mole percent of polymerized ethylene. The copolymer, prepared by the methods previously indicated, is essentially free of unsaturation. It has an intrinsic viscosity (I.V.) of 3.0, measured in toluene at 25° C. The ingredients are milled for about 10 minutes at about 40° C. In this table the silanol is reacted with trimethyl chlorosilane to the extent and amount indicated and the composition is vulcanized for 30 minutes at 125° C.

Table I

| Amount, phr. coated silica | Mole percent —SiOH converted | ZnO, phr. | Benzoyl peroxide, phr. | Sulfur, phr. | Other ingredients, phr. | Tensile properties | | |
|---|---|---|---|---|---|---|---|---|
| | | | | | | $T_B$ | $E_B$ | $M_{300}$ |
| 60 | 100 | 5 | 3 | 1 | ---------- | 3,000 | 700 | 484 |
| 60 | 100 | 5 | 3 | 1 | PbO, 5.0 | 3,600 | 760 | 411 |
| 60 | 100 | 5 | 3 | 0.5 | ---------- | 3,810 | 725 | 515 |
| 60 | 100 | 5 | 3 | 1.0 | TiO₂, 5.0 | 3,210 | 865 | 360 |
| 60 | 100 | 0 | 3 | 1.0 | PbO, 5.0 | 3,210 | 780 | 405 |
| 60 | 100 | 10 | 2.5 | 1.0 | ---------- | 2,940 | 780 | 390 |
| 60 | 100 | 5 | 3 | 1.0 | ---------- | 2,630 | 975 | 400 |
| 60 | 40 | 5 | 3 | 1.0 | ---------- | 1,170 | 950 | ----- |
| 60 | 15 | 5 | 3 | 1.0 | ---------- | 1,160 | 850 | ----- |
| 60 | 4 | 5 | 3 | 1.0 | ---------- | 2,720 | 750 | 710 |
| 40 | 100 | 5 | 3 | 1.0 | ---------- | 2,850 | 730 | 700 |
| 50 | 100 | 5 | 3 | 1.0 | ---------- | 2,990 | 700 | 840 |
| 70 | 100 | 5 | 3 | 1.0 | ---------- | 2,970 | 720 | 900 |
| 90 | 100 | 5 | 3 | 0 | ---------- | 944 | 771 | 362 |
| 60 | 50 | 5 | 3 | 1 | ---------- | 715 | 265 | ----- |
| 0 | ---------- | 0 | 8 | 0 | ---------- | 1,695 | 600 | 651 |
| 60 | 100 | 0 | 3 | 3 | ---------- | 1,018 | 200 | ----- |

EXAMPLE II

For this example and the data in Table II, the same procedures are repeated except that the silanol groups are reacted with dimethyl dichlorosilane.

Table II

| Amount, phr. coated silica | Mole percent, —SiOH Converted | ZnO, phr. | Benzoyl peroxide, phr. | Sulfur, phr. | Other ingredients, phr. | Tensile Properties | | | |
|---|---|---|---|---|---|---|---|---|---|
| | | | | | | $T_B$ | $E_B$ | $M_{300}$ | Set |
| 80 | 40 | 5 | 3 | 1 | ---------- | 3,055 | 935 | 445 | 63 |
| 8 | 40 | 5 | 3 | 1 | ---------- | 2,000 | 950 | 405 | 85 |
| 80 | 40 | 4 | 2.5 | 1.5 | ---------- | 1,800 | 975 | 600 | 75 |
| 100 | 40 | 5 | 3 | 0.5 | ---------- | 3,550 | 600 | 725 | 10 |
| 100 | 40 | 0 | 3 | 0.5 | MgO------ | 2,670 | 900 | 450 | 35 |
| 60 | 40 | 5 | 3.5 | 1.0 | CaO,2----- | 2,950 | 850 | 620 | 30 |
| ¹60 | 40 | 5 | 3.0 | 1.0 | ---------- | 2,870 | 840 | 600 | 41 |
| ¹60 | 100 | 5 | 3.0 | 1.0 | ---------- | 3,150 | 750 | 530 | 28 |
| ¹60 | 40 | 5 | 2.5 | 1.5 | ---------- | 2,100 | 1,010 | 380 | 65 |
| ¹60 | 100 | 5 | 2.5 | 1.0 | ---------- | 2,320 | 980 | 480 | 52 |
| ¹60 | 100 | 5 | 2.5 | 2.0 | ---------- | 1,950 | 1,020 | 450 | 70 |

¹ The copolymer contains 61% polymerized ethylene; I.V., 4.2.

EXAMPLE III

In this example procedures of Example I are repeated again except that the copolymer contains 61% polymerized ethylene and the I.V. is 4.2 Further, the silanol surfaces are modified by esterification with butanol.

Table III

| Amount, phr. coated silica | Mole percent, —SiOH Converted | ZnO, phr. | Benzoyl peroxide, phr. | Sulfur, phr. | Other ingredients, phr. | Tensile Properties | | | |
|---|---|---|---|---|---|---|---|---|---|
| | | | | | | $T_B$ | $E_B$ | $M_{300}$ | Set |
| 60 | 100 | 5 | 3 | 1 | ---------- | 3,100 | 760 | 555 | 29 |
| 60 | 50 | 5 | 2.5 | 1.5 | ---------- | 2,300 | 980 | 390 | 66 |
| 50 | 30 | 8 | 3 | 2.0 | ---------- | 2,980 | 860 | 620 | 40 |
| 40 | 100 | 3 | 3 | 1 | PbO₂, 2-- | 2,900 | 720 | 610 | 30 |
| 30 | 100 | 5 | 3.5 | 1 | PbHPO₄--- | 3,010 | 710 | 620 | 34 |
| 60 | 100 | 0 | 3.5 | 1 | PbHPO₄--- | 3,000 | 720 | 610 | 32 |
| 60 | 100 | 5 | 0 | 1 | Dicumyl peroxide, 3.¹ | 2,970 | 860 | 600 | 33 |

¹ Vulcanized at 153° C. for 60 minutes.

EXAMPLE IV

Using the same procedures as indicated above, Table IV presents results where still other coated silicas are used and where the other ingredients are further modified. In the table, —A is the radical attached to the group —SiOA as previously discussed. For these cases the elastomer contains 48 mole percent polymerized ethylene.

widely varied as to amounts and species, and the amounts depend a great deal on other variables in the copolymer. For example, as the ethylene content of the copolymer increases, the amount of the free radical source needed is lower. The same applies as the molecular weight of the copolymer is increased. Conversely, with low molecular weight copolymers, which contain in the order of 20–30

Table IV

| —A | Amount, phr. | Mole Percent—SiOH Converted | ZnO, phr. | Peroxide, phr. | Sulfur, phr. | Other Ingredients, phr. | Tensile properties ||||
|---|---|---|---|---|---|---|---|---|---|---|
| | | | | | | | $T_B$ | $E_B$ | $M_{300}$ | Set |
| —$CH_2CHOHCH_3$ | 40 | 80 | 5 | 3 | 2.0 | | 2,320 | 980 | 320 | 47 |
| —$CH_2CHOHCH_3$ | 60 | 50 | 5 | 2.5 | 1.0 | | 2,370 | 950 | 360 | 40 |
| —$CH_2CHOHCH_3$ | 60 | 100 | 5 | 3 | 1.0 | | 2,700 | 820 | 490 | 35 |
| —$CH_2CHOHCH_3$ | 80 | 40 | 0 | 2 | 1.0 | CdO, 6 | 2,500 | 880 | 470 | 40 |
| —$CH_2CHOHCH_2CH_3$ | 50 | 50 | 5 | 3 | 2.0 | | 2,150 | 1,050 | 350 | 71 |
| —$CH_2CHOHCH_2CH_3$ | 60 | 100 | 5 | 2 | 1.5 | | 2,330 | 1,000 | 420 | 67 |
| —$CH_2CHOHCH_2CH_3$ | 60 | 50 | 5 | 3 | 1.5 | | 2,400 | 950 | 400 | 53 |
| —$CH_2CHOHCH_2CH_3$ | 70 | 80 | 0 | 3 | 1.0 | $SnO_2$, 8 | 2,300 | 950 | 380 | 47 |
| —$COC_2H_5$ | 50 | 100 | 5 | 2.5 | 1.0 | | 2,400 | 980 | 390 | 61 |
| —$COC_2H_5$ | 60 | 100 | 5 | 2.5 | 1.0 | | 2,350 | 1,010 | 390 | 67 |
| —$COC_2H_5$ | 70 | 100 | 0 | 3.0 | 1.0 | | 1,800 | 910 | 280 | 80 |
| —$OC_8H_{17}$ | 50 | 60 | 5 | 3.0 | 1.0 | | 2,860 | 850 | 590 | 30 |
| —$OC_8H_{17}$ | 60 | 60 | 5 | 3.0 | 1.0 | | 2,920 | 780 | 620 | 36 |
| —$OC_8H_{17}$ | 70 | 50 | 5 | 3.0 | 1.0 | | 2,890 | 750 | 600 | 31 |
| —$OC_{16}H_{33}$ | 50 | 100 | 5 | 3.0 | 1.0 | | 2,910 | 730 | 550 | 22 |
| —$OC_{16}H_{33}$ | 60 | 100 | 5 | 3.0 | 1.0 | | 2,950 | 750 | 710 | 18 |
| —$OC_{16}H_{33}$ | 70 | 100 | 0 | 3.0 | 1.0 | BaO, 10 | 2,150 | 980 | 490 | 43 |

From the examples and accompanying data it will be seen that products having good rubber qualities are obtained, but the most outstanding feature is the combination of the good physical properties and the absence of the obnoxious and offensive odor particularly when the copolymers are vulcanized with sulfur and a peroxide as benzoyl peroxide. These features are also extended to other elastomeric ploymers having up to six carbon atoms.

EXAMPLE V

A copolymer of ethylene and pentene-1 is prepared by polymerizing a mixture of monomers with a catalyst of $AlEt_2Cl$ and $VCl_3$. To the resulting solution of the elastomer in n-pentane is added a suspension of modified silica wherein the surface silanol groups are esterified with butanol. The conversion of the silanol groups is about 100% and the amount added is sufficient to give 60 phr. The elastomeric composition is then coagulated by mass addition of propanol followed by filtering and drying. To the mixture is added 5 phr. of zinc oxide, 3 phr. of sulfur and 1 phr. of benzoyl peroxide. The mixture is milled and vulcanized as in the previous examples and the vulcanizate is free of offensive odor and has fine physical properties. In the same way a copolymer of ethylene and butene-1 also has highly useful rubber properties as well as being free of offensive odor. Copolymers prepared from two monomers wherein one monomer is other than ethylene also will result in elastomers but they are more costly to vulcanize as they require considerably more of the material used to generate free radicals on the copolymer. A copolymer of this class is, for example, the 1-butene-pentene-1 copolymer.

Another aspect of this invention is that novel duplex films of the elastomeric copolymers may be obtained without using adhesives or bonding agents. Such films may be obtained by vulcanizing raw sheets of the above-described elastomers on top of, for example, polyethylene, polypropylene, cellulose and the like. The resulting product is a tough elastomeric sheet with a plastic backing that is useful in the manufacture of conveyor belts, floor coverings and the like.

From the foregoing description, it will be readily apparent to persons skilled in the art that the compositions of this invention are capable of wide variation not only in regard to the several ingredients but also their respective amounts. Thus, the free radical source may be widely varied as to amounts and species, and the amounts depend a great deal on other variables in the copolymer. For example, as the ethylene content of the copolymer increases, the amount of the free radical source needed is lower. The same applies as the molecular weight of the copolymer is increased. Conversely, with low molecular weight copolymers, which contain in the order of 20–30 mole percent of polymerized ethylene, larger amounts of the free radical source is required. Thus, a free radical source may be used in amounts ranging from 0.1 up to 12 phr. of copolymer, with amounts in the order of 1 to 5 phr. being used in the more preferred embodiments of the invention. Still other modifications and the factors that govern them will be understood by persons skilled in the art.

We claim as our invention:

1. A sulfur vulcanizable composition comprising a blend of (1) an elastomeric copolymer of mono-alpha-olefins having up to 6 carbon atoms, the copolymer being essentially free of ethylenic unsaturation, (2) a modified silica substrate wherein the silica contains surface silanol groups that are replaced with radicals containing terminal alkyl groups having from 1 to 18 carbon atoms, (3) a compound of a basic metal selected from the group consisting of basic metal oxides, basic metal salts of organic acids having an ionization constant less than $10^{-4}$, and basic lead salts, (4) sulfur and (5) a free radical source of a group consisting of organic peroxides and aryl-substituted triazenes.

2. The composition of claim 1 wherein the silanol groups are modified with trimethyl chlorosilane.

3. The composition of claim 1 wherein the silanol groups are modified with dimethyl chlorosilane.

4. The composition of claim 1 wherein the silanol groups are modified by esterification with a lower alcohol.

5. The composition of claim 1 wherein the silanol groups are modified by esterification with n-butyl alcohol.

6. The composition of claim 1 wherein the elastomer is a copolymer of ethylene and propylene.

7. The composition of claim 1 wherein the basic metal compound is zinc oxide.

8. A sulfur vulcanizable composition comprising a blend of (1) an elastomeric copolymer of ethylene and one other mono-alpha-olefin having up to 6 carbon atoms, the copolymer being essentially free of ethylenic unsaturation, (2) a free radical source of a group consisting of organic peroxides and aryl-substituted triazenes, (3) a free radical acceptor of the group consisting of sulfur, quinones, quinhydrones and polynuclear aromatic hydrocarbons, (4) a basic metal oxide, and (5) a modified silica substrate wherein the silica contains surface silanol groups that are replaced with radicals containing terminal alkyl groups having from 1 to 18 carbon atoms.

9. The composition of claim 8 wherein the silanol groups are modified with trimethyl chlorosilane.

10. The composition of claim 8 wherein the silanol groups are modified with dimethyl dichlorosilane.

11. The composition of claim 8 wherein the silanol groups are modified by esterification with a lower alcohol.

12. The composition of claim 8 wherein the silanol groups are modified by esterfication with n-butyl alcohol.

13. The composition of claim 8 wherein the metal oxide is zinc oxide.

14. The composition of claim 8 wherein the metal oxide is titanium oxide.

15. The composition of claim 8 wherein the metal oxide is magnesium oxide.

16. A sulfur vulcanizable composition comprising a blend of (1) an elastomeric copolymer of ethylene and propylene, the copolymer being essentially free of ethylenic unsaturation, (2) benzoyl peroxide, (3) sulfur, (4) zinc oxide, and (5) a modified silica substrate wherein the silica contains surface silanol groups that are replaced with radicals containing terminal alkyl groups having from 1 to 18 carbon atoms.

References Cited by the Examiner

UNITED STATES PATENTS

| | | | |
|---|---|---|---|
| 2,657,149 | 10/1953 | Iller | 260—41.5 |
| 2,739,076 | 3/1956 | Iller | 260—41 |
| 2,888,424 | 5/1959 | Precopio et al. | |
| 2,928,801 | 3/1960 | Safford et al. | 260—41 |
| 2,933,480 | 4/1960 | Gresham et al. | |
| 2,958,672 | 11/1960 | Goldberg. | |
| 2,983,714 | 5/1961 | Robinson et al. | |
| 2,991,264 | 7/1961 | Monroe et al. | 260—41 |
| 2,993,809 | 7/1961 | Bueche et al. | 260—37 |
| 3,012,016 | 12/1961 | Kirk et al. | 260—41 |
| 3,012,020 | 12/1961 | Kirk et al. | 260—41 |

FOREIGN PATENTS 564,040  9/1958  Canada.

ALEXANDER H. BRODMERKEL, *Primary Examiner.*

DANIEL ARNOLD, MORRIS LIEBMAN, *Examiners.*

B. S. LEON, K. B. CLARKE, J. S. WALDRON,
*Assistant Examiners.*